(12) United States Patent
Chen et al.

(10) Patent No.: US 11,914,240 B2
(45) Date of Patent: Feb. 27, 2024

(54) SPLICED DISPLAY SCREEN

(71) Applicant: TCL CHINA STAR OPTOELECTRONICS TECHNOLOGY CO., LTD., Guangdong (CN)

(72) Inventors: Yao Chen, Guangdong (CN); Min Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 206 days.

(21) Appl. No.: 17/626,517

(22) PCT Filed: Dec. 30, 2021

(86) PCT No.: PCT/CN2021/143065
§ 371 (c)(1),
(2) Date: Jan. 12, 2022

(87) PCT Pub. No.: WO2023/123203
PCT Pub. Date: Jul. 6, 2023

(65) Prior Publication Data
US 2023/0204997 A1    Jun. 29, 2023

(30) Foreign Application Priority Data
Dec. 27, 2021    (CN) .......................... 202111618958.3

(51) Int. Cl.
*G02F 1/1333*    (2006.01)
*G02F 1/1339*    (2006.01)

(52) U.S. Cl.
CPC ........ *G02F 1/13336* (2013.01); *G02F 1/1339* (2013.01); *G02F 1/133314* (2021.01); *G02F 1/133325* (2021.01)

(58) Field of Classification Search
CPC ......... G02F 1/133314; G02F 1/133317; G02F 1/133322; G02F 1/13332; G02F 1/133608; G02F 1/13336; H01L 27/3293
See application file for complete search history.

(56) References Cited

U.S. PATENT DOCUMENTS

| | | |
|---|---|---|
| 2008/0158468 A1 | 7/2008 | Kim et al. |
| 2012/0113614 A1 | 5/2012 | Watanabe |

(Continued)

FOREIGN PATENT DOCUMENTS

| | | |
|---|---|---|
| CN | 101211048 A | 7/2008 |
| CN | 104360519 A | 2/2015 |

(Continued)

OTHER PUBLICATIONS

International Search Report in International application No. PCT/CN2021/143065, dated Aug. 2, 2022.

(Continued)

*Primary Examiner* — Angela K Davison
(74) *Attorney, Agent, or Firm* — Mark M. Friedman (57) ABSTRACT

A spliced display screen is disclosed. The spliced display screen includes a case body, a backlight unit disposed on a side of the case body, at least two liquid crystal display (LCD) panels spliced to each other, a first magnetic unit, and a second magnetic unit. The LCD panels are attached to the case body and are disposed on a light-emitting side of the backlight unit. The first magnetic unit is disposed on a side of the case body close to the LCD panel. The second magnetic unit is disposed on a side of the LCD panels close to the backlight unit. Polarity of the first magnetic unit and polarity of the second magnetic unit are same.

20 Claims, 7 Drawing Sheets

(56) References Cited

U.S. PATENT DOCUMENTS

2016/0198578 A1 7/2016 Du
2020/0221586 A1 7/2020 Gao et al.

FOREIGN PATENT DOCUMENTS

| CN | 105093628 A | 11/2015 |
|---|---|---|
| CN | 111145651 A | 5/2020 |
| CN | 111830748 A | 10/2020 |
| CN | 113391478 A | 9/2021 |
| TW | 200811524 A | 3/2008 |

OTHER PUBLICATIONS

Written Opinion of the International Search Authority in International application No. PCT/CN2021/143065, dated Aug. 2, 2022.
Chinese Office Action issued in corresponding Chinese Patent Application No. 202111618958.3 dated Dec. 28, 2022, pp. 1-7.

SPLICED DISPLAY SCREEN

FIELD

The present disclosure relates to a field of display, and more particularly, to a spliced display screen.

BACKGROUND

With continuous development of display device technologies, display devices have been used in diverse fields. The display devices are not only be used in televisions, monitors, industry displays, or medical displays, but also be increasingly used in public displays. Generally, display devices need to have a relatively large display area to satisfy requirements of being viewed from long distances and great amount of information. However, conventional liquid crystal displays (LCDs) have a normal size ranging from 32 inches to 52 inches. If the LCDs having such range of size needs to be used in public displays, they need to be spliced to each other.

During splicing processes spliced display screens, a splicing junction between two adjacent LCD panels needs to be supported by a middle frame. A width of the middle frame is greater than a width of edge frames of the LCD panels, resulting in dark strips appearing on the spliced display screens corresponding to the splicing junction. As such, users' visual experiences are significantly affected.

SUMMARY

An embodiment of the present disclosure provides a spliced display screen to solve a technical issue of dark strips appearing on the spliced display screens corresponding to the splicing junction.

An embodiment of the present disclosure provides A spliced display screen, comprising:

a case body;

a backlight unit disposed on a side of the case body;

at least two liquid crystal display (LCD) panels spliced to each other, wherein the at least two LCD panels are attached to the case body and are disposed on a light-emitting side of the backlight unit, and each of the at least two LCD panels comprises an edge frame;

a first magnetic unit disposed on a side of the at least two LCD panels close to the case body, wherein the first magnetic unit corresponds to the edge frame at a splicing junction between two adjacent LCD panels; and a second magnetic unit disposed on a side of the at least two LCD panels close to the backlight unit, the second magnetic unit corresponds to the first magnetic unit and is spaced apart from the first magnetic unit, polarity of the first magnetic unit and polarity of the second magnetic unit are same, and a width of the edge frame is greater than or equal to a width of the second magnetic unit.

In the spliced display screens provided by the embodiment of the present disclosure, the LCD panels are supported by a mutual exclusion magnetic force between the first magnetic unit and the second magnetic unit. Cooperation between the first magnetic unit and the second magnetic unit replaces middle frames. A width of edge frames is greater than or equal to a width of the second magnetic unit. Therefore, the second magnetic unit would not block light entering a display area of the LCD panels. As such, a dark strip issue of spliced display screens is solved.

Optionally, in some embodiments of the present disclosure, the case body comprises a backplate and a framework connected to a periphery of the backplate, the backplate and the framework define a containing recess, at least part of the backlight unit is disposed in the containing recess, the first magnetic unit is attached to the backplate, and the at least two LCD panels are attached to the framework.

In the spliced display screens provided by the embodiment of the present disclosure, since at least part of the backlight unit is disposed in the containing recess, a size of the spliced display screen can be reduced, and a thin and light body of the spliced display screen can be realized.

Optionally, in some embodiments of the present disclosure, the backplate is provided with a fixing strip corresponding to the first magnetic unit, and the first magnetic unit is disposed on the fixing strip.

In the spliced display screens provided by the embodiment of the present disclosure, the fixing strip is disposed on the backplate, and the first magnetic unit is attached to the fixing strip. The fixing strip has an elevation function, which is beneficial for increasing mutual repulsion between the first magnetic unit and the second magnetic, thereby stably supporting the LCD panels.

Optionally, in some embodiments of the present disclosure, the fixing strip is provided with a recess corresponding to the first magnetic unit, and the first magnetic unit is clamped in the recess.

In the spliced display screen provided by an embodiment of the present disclosure, the recess can confine the first magnetic unit, thereby preventing the first magnetic unit from being moved.

Optionally, in some embodiments of the present disclosure, the first magnetic unit is attached to the fixing strip by glue.

In the spliced display screen provided by an embodiment of the present disclosure, the first magnetic unit is attached in the recess of the fixing strip, thereby preventing the first magnetic unit from being moved. Therefore, the first magnetic unit can be firmly disposed in the recess of the fixing strip.

Optionally, in some embodiments of the present disclosure, a material of the fixing strip is a light-transmitting material.

In the spliced display screen provided by an embodiment of the present disclosure, the fixing strip would not block light, thereby increasing a usage rate of light.

Optionally, in some embodiments of the present disclosure, the framework is provided with a guide recess corresponding to the first magnetic unit, and an end of the first magnetic unit is disposed in the corresponding guide recess.

In the spliced display screen provided by an embodiment of the present disclosure, during assembly processes, the guide recess can guide the first magnetic unit to be assembled, thereby effectively improving assembling efficiency.

Optionally, in some embodiments of the present disclosure, a distance between the first magnetic unit and the second magnetic unit corresponding to the first magnetic unit ranges from 1 mm to 5 mm.

In the spliced display screen provided by an embodiment of the present disclosure, the distance between the first magnetic unit and the second magnetic unit corresponding to the first magnetic unit ranges from 1 mm to 5 mm. Therefore, a magnetic force between the first magnetic unit and the second magnetic is enough to have a support function.

Optionally, in some embodiments of the present disclosure, the second magnetic unit is attached to the at least two LCD panels by glue.

In the spliced display screen provided by an embodiment of the present disclosure, the second magnetic unit is attached to the at least two LCD panels by glue, which is simple and easy to be realized. Therefore, the second magnetic unit can be stably attached to the LCD panels.

Optionally, a material of the first magnetic unit and a material of the second magnetic unit are selected from one or more of Fe, Ni, Co, Nd, Al, Cu, Ti, Mo, Ce, Pr, and La.

In the spliced display screen provided by an embodiment of the present disclosure, the above magnetic materials can ensure a good magnetic force between the first magnetic unit and the second magnetic unit.

Optionally, in some embodiments of the present disclosure, the first magnetic unit comprises a plurality of first magnetic blocks spacedly arranged along a splicing gap between the at least two LCD panels, and the second magnetic unit comprises a plurality of second magnetic blocks spacedly arranged along the splicing gap between the at least two LCD panels.

In the spliced display screen provided by an embodiment of the present disclosure, a gap between two adjacent magnetic blocks can allow light to pass through, thereby increasing a usage rate of light and alleviating a dark strip issue.

Optionally, in some embodiments of the present disclosure, each of the first magnetic blocks is provided with a first hollow opening configured to allow light to pass through, and each of the second magnetic blocks is provided with a second hollow opening configured to allow light to pass through.

In the spliced display screen provided by an embodiment of the present disclosure, the hollow opening of the first magnetic blocks and the hollow opening of the second magnetic blocks can allow light to pass through, thereby increasing a usage rate of light and alleviating a dark strip issue.

Optionally, in some embodiments of the present disclosure, the spliced display screen comprises a flexible connector abutting against a side of the at least two LCD panels away from the backlight unit, the first flexible connector corresponds to the edge frame of the at least two LCD panels, and two ends of the first flexible connector are attached to the case body.

In the spliced display screen provided by an embodiment of the present disclosure, the first flexible connector can prevent edges of the LCD panels corresponding to the splicing gap from outward protruding due to an overly great magnetic force between the first magnetic unit and the second magnetic unit. Therefore, a surface of two adjacent LCD panels can be flatter.

Optionally, in some embodiments of the present disclosure, a material of the first flexible connector is a light-transmitting material.

In the spliced display screen provided by an embodiment of the present disclosure, the first flexible connector is made of the light-transmitting material. Therefore, light can pass through the first connector, thereby preventing the first connector from blocking light emitted from the LCD panels.

Optionally, in some embodiments of the present disclosure, the first flexible connector is straight line-shaped, membrane-shaped, or mesh-shaped.

In the spliced display screen provided by an embodiment of the present disclosure, making the first connector be straight line-shaped can prevent the first connector from blocking light emitted form the LCD panels. Making the first connector be membrane-shaped or be mesh-shaped can improve strength and support performance of the first connector.

Optionally, in some embodiments of the present disclosure, the spliced display screen comprises a second flexible connector, an end of the second flexible connector is connected to the first magnetic unit, and another end of the second flexible connector is connected to the second magnetic unit.

In the spliced display screen provided by an embodiment of the present disclosure, the second connector can fix the LCD panels, thereby preventing edges of the LCD panels corresponding to the splicing gap from outward protruding due to an overly great magnetic force between the first magnetic unit and the second magnetic unit. Therefore, a surface of two adjacent LCD panels can be flat.

Optionally, in some embodiments of the present disclosure, a material of the second flexible connector is a light-transmitting material.

In the spliced display screen provided by an embodiment of the present disclosure, since the material of the second flexible connector is the light-transmitting material, light can pass through the second connector. Therefore, light emitted from the LCD panels would not be blocked by the second connector.

Optionally, in some embodiments of the present disclosure, the second flexible connector is straight line-shaped, membrane-shaped, or mesh-shaped.

In the spliced display screen provided by an embodiment of the present disclosure, making the straight line-shaped second connector can prevent the second connector from blocking light emitted from the LCD panels. Making the second connector be membrane-shaped or be mesh-shaped can improve strength and support performance of the second connector.

Optionally, in some embodiments of the present disclosure, the backlight unit comprises a circuit board, a plurality of light sources disposed on the circuit board, a light guide board disposed on a light-emitting side of the light sources, and an optical film group disposed on a light-emitting side of the light guide board.

In the spliced display screen provided by an embodiment of the present disclosure, light emitted from the light sources is emitted outside before passing through the light guide board and the optical film group, thereby allowing light to be evenly emitted.

Optionally, in some embodiments of the present disclosure, a spacer is disposed on the circuit board, and an end of the spacer away from the circuit board abuts against the light guide board.

In the spliced display screen provided by an embodiment of the present disclosure, the spacer is disposed on the circuit board, and the end of the spacer away from the circuit board abuts against the light guide board. Therefore, a stable distance between light guide board and the light sources can be ensured.

Regarding the beneficial effects: an embodiment of the present disclosure provides a spliced display screen. A first magnetic unit is disposed on a case body. A second magnetic unit is disposed on a back surface of LCD panels. The first magnetic unit and the second magnetic unit are spacedly arranged along a direction perpendicular to the case body. Polarity of the first magnetic unit and the polarity of the second magnetic unit are same. The LCD panels can be supported by a mutual exclusion magnetic force between the first magnetic unit and the second magnetic unit. Cooperation between the first magnetic unit and the second magnetic unit replaces middle frames. A width of edge frames is greater than or equal to a width of the second magnetic unit. Therefore, the second magnetic unit would not block light entering a display area of the LCD panels. As such, a dark strip issue of spliced display screens is solved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure. In addition, it should be noted that described embodiments are merely used to construct the present disclosure and are not intended to limit the present disclosure. In the present disclosure, unless further description is made, terms such as "top" and "bottom" usually refer to a top of a device and a bottom of a device in an actual process or working status, and specifically, to the orientation as shown in the drawings. Terms such as "inside" and "outside" are based on an outline of a device.

An embodiment of the present disclosure provides a spliced display screen which is described below in detail. It should be noted that a following description order of embodiments does not mean a preferred description order of the embodiments.

Figure 1:
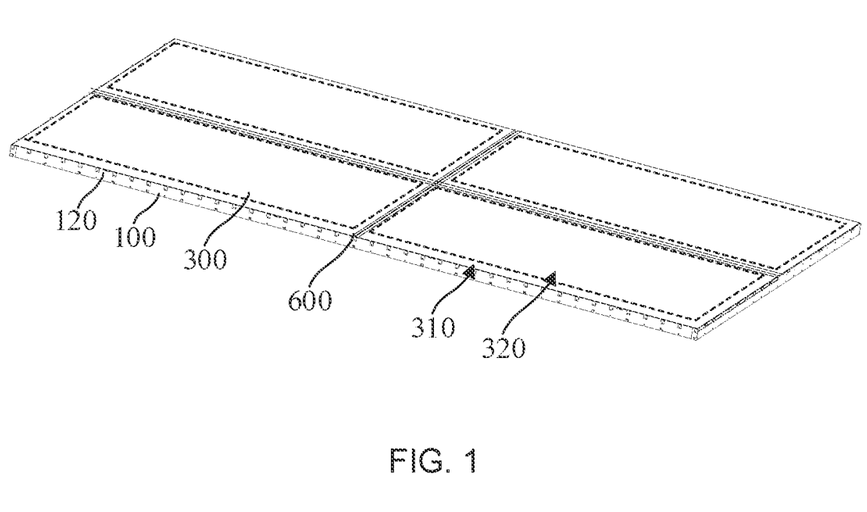
FIG. 1 is a three-dimensional structural schematic view showing a spliced display screen provided by an embodiment of the present disclosure.
Figure 2:
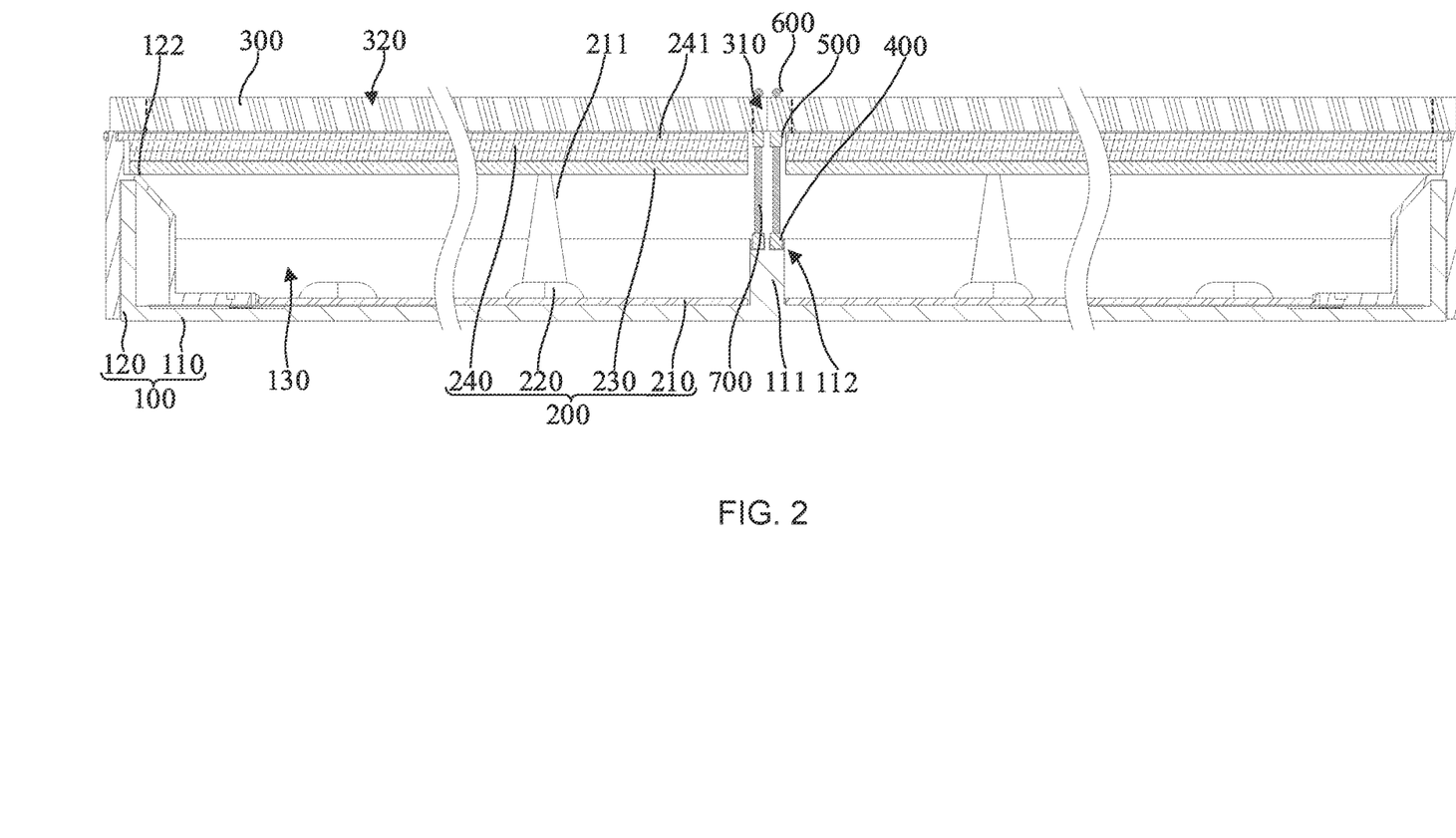
FIG. 2 is a perspective structural schematic view showing the spliced display screen provided by the embodiment of the present disclosure.
Figure 3:
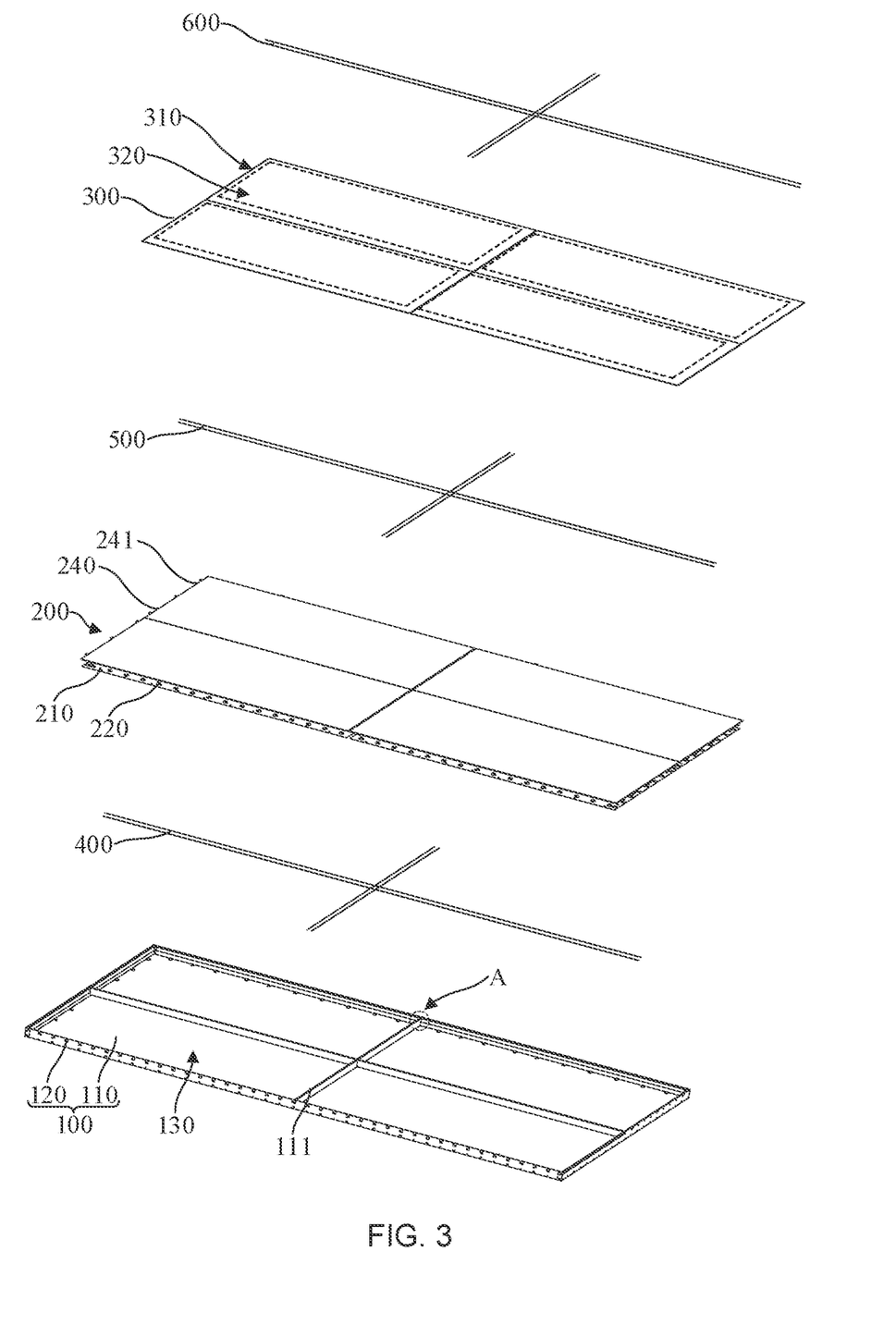
FIG. 3 is an exploded structural schematic view showing the spliced display screen provided by the embodiment of the present disclosure.

Please refer to FIG. 1 to FIG. 3, an embodiment of the present disclosure provides a spliced display screen, including a case body 100, a backlight unit 200, at least two spliced liquid crystal display (LCD) panels 300, a first magnetic unit 400, and a second magnetic unit 500. The backlight unit 200 is disposed on a side of the case body 100. The backlight unit 200 is configured to emit light toward the LCD panel 300. The LCD panel 300 is attached to the case body 100 and is located on a light-emitting side of the backlight unit 200, so that the LCD panel 300 can receive light emitted from the backlight unit 200 to display an image. The first magnetic unit 400 is arranged on a side of the case body 100 close to the LCD panel 300, and the second magnetic unit 500 is arranged on a side of the LCD panel 300 close to the backlight unit 200. The second magnetic unit 500 corresponds to the first magnetic unit 400. The second magnetic unit 500 and the first magnetic unit 400 are spacedly disposed. Polarity of the first magnetic unit 400 is same as polarity of the second magnetic unit 500, so that a mutual exclusion magnetic force is formed between the first magnetic unit 400 and the second magnetic unit 500. Because of the mutual exclusion magnetic force between the first magnetic unit 400 and the second magnetic unit 500, the LCD panel 300 can be supported.

In the spliced display screen provided by the embodiment of the present disclosure, the LCD panel 300 has an edge frame 310 and a display area 320. The edge frame 310 is arranged around the display area 320. The first magnetic unit 400 corresponds to the edge frame 310 at a splicing junction between two adjacent LCD panels 300. Because the second magnetic unit 500 corresponds to the first magnetic unit 400, the second magnetic unit 500 corresponds to the edge frame 310 at the splicing junction between two adjacent LCD panels 300. A width of the edge frame 310 is greater than or equal to a width of the magnetic unit 500. The first magnetic unit 400 and the second magnetic unit 500 would not block light entering the display area 320 of the LCD panel 300, thereby solving a dark strip issue of spliced panels. In the present embodiment, to better solve the dark strip issue, the width of the edge frame 310 can also be greater than or equal to the width of the first magnetic unit 400.

Conventional technical solutions are to provide an uninterrupted middle frame at a splicing junction between two adjacent LCD panels 300. Part of light emitted from the backlight unit 200 is absorbed by the middle frame at the splicing junction, which inevitably reduced a usage rate of light. In the spliced display screen provided the embodiment of the present application, since the second magnetic unit 500 and the first magnetic unit 400 are spacedly disposed, light emitted from the backlight unit 200 can pass through a gap between the second magnetic unit 500 and the first magnetic unit 400, thereby increasing a usage rate of light, and increasing a brightness at the splicing junction. Therefore, a dark strip issue at the splicing junction is solved.

It should be noted that the above-mentioned width refers to a distance between two opposite sides of a corresponding structure along a direction perpendicular to an extending direction of a splicing gap.

In two adjacent LCD panels 300, the edge frame 310 at the splicing junction of one of the LCD panels 300 corresponds to one first magnetic unit 400 and one second magnetic unit 500. Another edge frame 310 at the splicing junction of the other LCD panels 300 corresponds to another first magnetic unit 400 and another second magnetic unit 500. Alternatively, the edge frame 310 at the splicing junction between two adjacent LCD panels 300 corresponds to same first magnetic unit 400 and same second magnetic unit 500. Of course, according to actual situations and specific requirements, in two adjacent liquid crystal display panels 300, the edge frame 310 at the splicing junction of one of the LCD panels 300 can correspond to at least two first magnetic units 400 and at least two second magnetic units 400. Another edge frame 310 of the LCD panels 300 corresponds to other at least two first magnetic units 400 and other at least two magnetic units 500.

It should be noted that in the spliced display provided by the embodiment of the present application, part of the edge frame 310 of the LCD panels 300 is attached to the case body 100. The edge frame 310 at the splicing junction between two adjacent LCD panels 300 is supported by cooperation of the magnetic unit 400 and the second magnetic unit 500, thereby preventing incident light of the display area 320 from being blocked, and preventing a dark strip issue. In addition, the above arrangement can stably maintain a distance between the LCD panels 300 and the backlight unit 200, thereby preventing display abnormality due to the backlight unit 200 being crushed by the LCD panels 300.

Specifically, as shown in FIG. 2 and FIG. 3, the case body 100 includes a backplate 110 and a framework 120. The framework 120 is connected to a periphery of the backplate 110. That is, the framework 120 is arranged around the backplate 110, so that the backplate 110 and the framework 120 define a containing recess 130. At least part of the backlight unit 200 is disposed in the containing recess 130. By disposing at least part of the backlight unit 200 in the containing recess 130, a size of a spliced display screen can be reduced, thereby realizing a thin and light body of the spliced display screen. In the present embodiment, the first magnetic unit 400 is attached to the backplate 110, and the LCD panels 300 are attached to the framework 120.

It can be understood that, in the embodiment of the present disclosure, the backlight unit 200 is completely disposed in the containing recess 130. However, according to actual situations and specific requirements, the backlight unit 200 can also be only partially disposed in the containing recess 130, and the remaining part is disposed outside the case body 100, which can also achieve the thin and light body. A disposing position of the backlight unit 200 is not limited here.

Specifically, as shown in FIG. 2 and FIG. 3, the backplate 110 is provided with a fixing strip 111 corresponding to the first magnetic unit 400, and the first magnetic unit 400 is disposed on the fixing rib 111. In this structure, the first magnetic unit 400 is attached to the fixing strip 111 disposed on the backplate 110. The fixing strip 111 has a heightening effect, which is beneficial for increasing the mutually repulsive magnetic force between first magnetic unit 400 and the second magnetic unit 500, thereby stably supporting the LCD panels 300.

Specifically, in the spliced display screen provided by the embodiment of the present disclosure, the fixing strip 111 is disposed at the splicing junction between two adjacent LCD panels 300. The first magnetic unit 400 corresponding to one of the LCD panels 300 and another of the first magnetic unit 400 corresponding to the other of the LCD panels 300 are attached to a same fixing strip, thereby realizing a sample structure easy to be produced.

Figure 4:
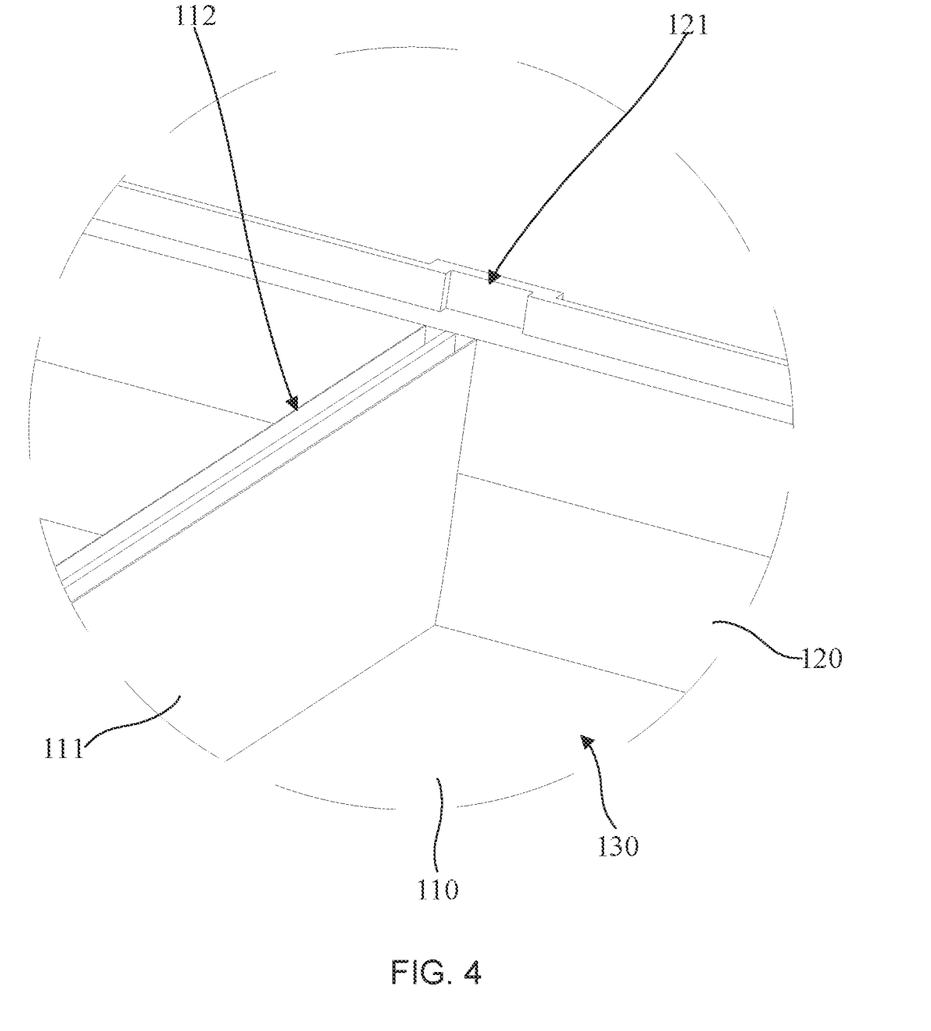
FIG. 4 is an enlarged structural schematic view showing area A of FIG. 3.

Specifically, as shown in FIG. 2 to FIG. 4, the fixing strip 111 is provided with a recess 112 corresponding to the first magnetic unit 400, and the first magnetic unit 400 is clamped in the recess 112. The recess 112 can confine the first magnetic unit 400 and prevent the first magnetic unit 400 from being moved. In the present embodiment, the fixing strip 111 corresponds to the edge frame 310 of the LCD panels 300, so that the first magnetic unit 400 can be confined at the edge frame 310.

Specifically, in the spliced display screen provided the embodiment of the present disclosure, each fixing strip 111 is provided with two recesses 112.

One of the recesses 112 corresponds to the first magnetic unit 400 of one LCD panel 300, and the other recesses 112 corresponds to another first magnetic unit 400 of the LCD panels 300. Of course, according to actual situations and specific requirements, each fixing strip 111 may also be provided with the recess 112 simultaneously corresponding to the first magnetic units 400 of two adjacent LCD panels 300. The correspondence is not limited here.

Specifically, a material of the fixing strip 111 is a light-transmitting material. Therefore, the fixing strip 111 would not block light, thereby increasing a usage rate of light. In the present embodiment, the light-transmitting material may be selected from one or more of polymethyl methacrylate, polyimide, epoxy resin, polyethylene terephthalate, polycarbonate, polyvinyl chloride, polystyrene, and propylene.

Specifically, in the spliced display screen of the embodiment of the present application, the first magnetic unit 400 is disposed in and attached to the recess 112 of the fixing strip 111 by glue. For example, it is possible, but not limited, to use ultraviolet (UV) curing glue to attach the first magnetic unit 400 to the recess 112 of the fixing strip 111, thereby preventing the first magnetic unit 400 from being moved. Therefore, the first magnetic unit 400 can be firmly disposed in the recess 112 of the fixing strip 111.

Specifically, as shown in FIG. 2 to FIG. 4, the framework 120 is provided with a guide recess 121 corresponding to the first magnetic unit 400. An end of the first magnetic unit 400 is disposed in the corresponding guide recess 121. During assembly processes, the guide recess 121 can guide the first magnetic unit 400 to be assembled, which effectively improves assembly efficiency.

Specifically, a distance between the first magnetic unit 400 and a corresponding second magnetic unit 500 ranges from 1 mm to 5 mm, which ensures a sufficient magnetic force between the first magnetic unit 400 and the second magnetic unit 500 to have a support function. In the spliced display screen provided by the embodiment of the present disclosure, the distance between the first magnetic unit 400 and the corresponding second magnetic unit 500 may be 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6mm, 2.7 mm, 2.8 mm, 2.88 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, or 5 mm. According to actual situations and specific requirements, the distance between the first magnetic unit 400 and the corresponding second magnetic unit 500 can be adjusted appropriately.

Specifically, in the spliced display screens provided by the embodiment of the present disclosure, the LCD panels 300 are attached to the framework 120 by glue. For example, it is possible, but not limited, to use UV curing glue to attach part of the framework 310 of the LCD panels 300 to the framework 120, which is simple to operate and easy to implement. Furthermore, this can make the LCD panels 300 be stably attached to the framework 120.

Specifically, in the spliced display provided by the embodiment of the present disclosure, the second magnetic unit 500 is attached to the LCD panels 300 by glue. For example, it is possible, but not limited, to use UV curing glue to bond part of the framework 310 of the second magnetic unit 500 to the LCD panels 300, which is simple to operate and easy to implement. Furthermore, this can make the second magnetic unit 500 be stably attached to a back surface of the LCD panels 300.

Specifically, a material of the first magnetic unit 400 and a material of the second magnetic unit 500 are selected from one or more of iron, nickel, cobalt, neodymium, aluminum, copper, titanium, molybdenum, cerium, praseodymium, and lanthanum. Therefore, the first magnetic unit 400 and the second magnetic unit 500 can be ensured to have good magnetic properties.

Specifically, as shown in FIG. 3, the LCD panels 300 and the backlight unit 200 have a one-to-one correspondence. In the present embodiment, the spliced display screen includes four LCD panels 300 and four backlight units 200. Of course, according to actual situations and specific requirements, one backlight unit 200 can correspond to at least two LCD panels 300. The correspondence is not limited here.

Figure 5:
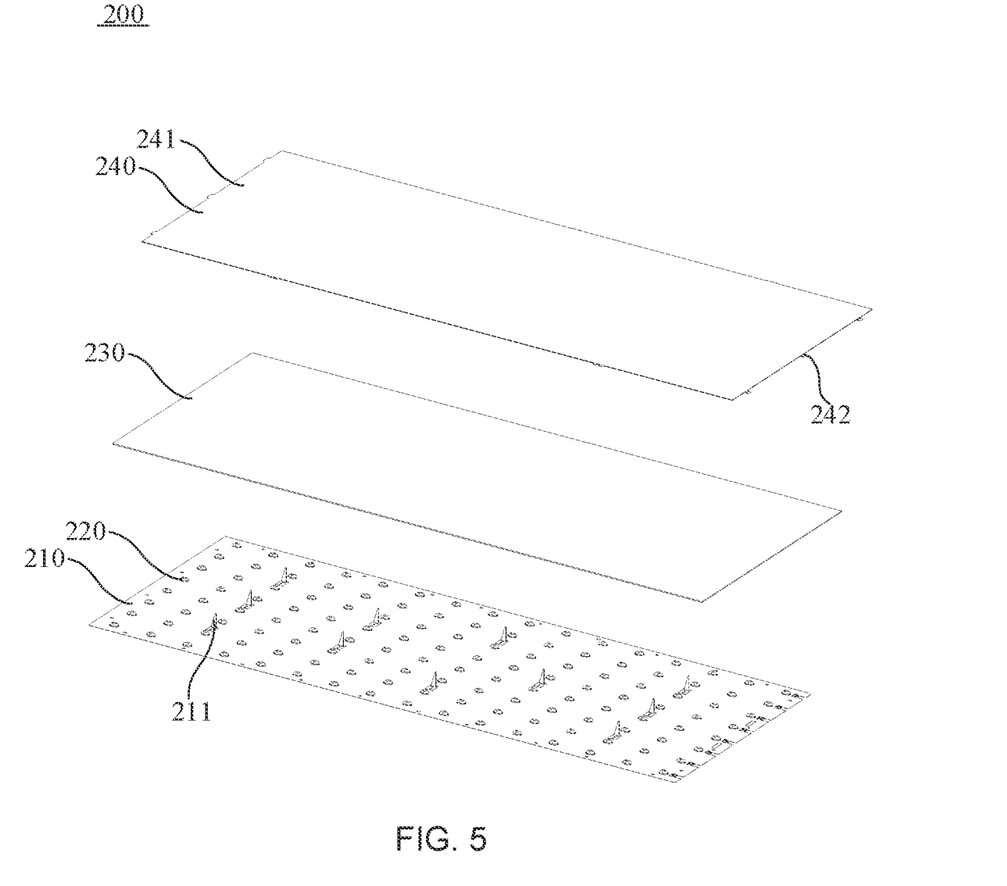
FIG. 5 is an exploded structural schematic view showing a backlight unit provided by an embodiment of the present disclosure.
Figure 6:
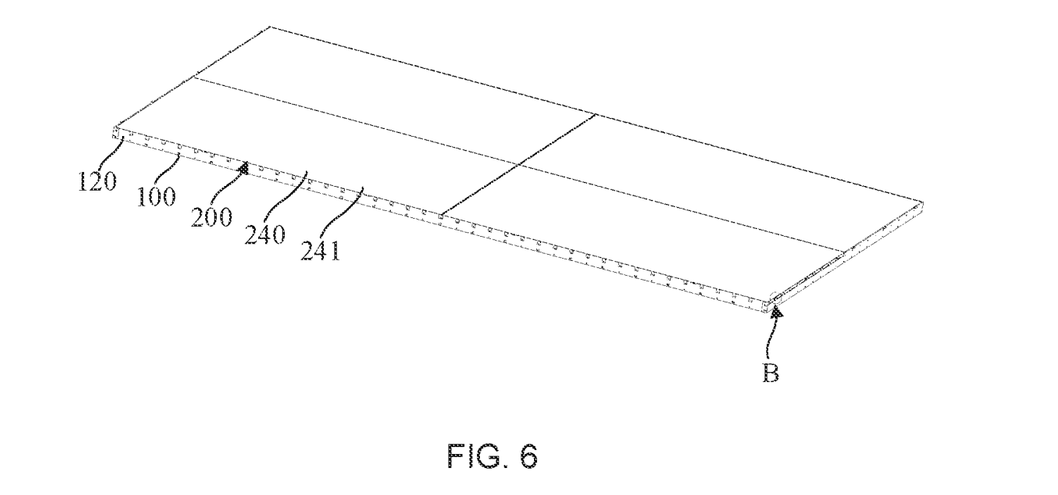
FIG. 6 is a three-dimensional structural schematic view showing the spliced display screen without LCD panels provided by the embodiment of the present disclosure.

Specifically, as shown in FIG. 2 and FIG. 5, the backlight unit 200 includes a circuit board 210, a plurality of light sources 220 disposed on the circuit board 210, a light guide board 230 disposed on a light-emitting side of the light sources 220, and an optical film group 240 disposed on a light-emitting side of the light guide board 230. The light sources 220 may be, but are not limited to, a plurality of light-emitting diode (LED) chips. Light emitted by the light sources 220 is emitted after passing through the light guide plate 230 and the optical film set 240, so that light can be evenly emitted.

Specifically, as shown in FIG. 2, the circuit board 210 is disposed in the containing recess 130. Specifically, the circuit board 210 is attached to a surface of the backplate 110. By disposing the circuit board 210 in the containing recess 130, not only can the circuit board 210 be protected, but also a thin and light body of the spliced display screen can be realized. In the present embodiment, the circuit board 210 can be attached to the surface of the backplate 110 by a screw, glue, or other methods. This structure is simple and is easy to be operated.

Specifically, as shown in FIG. 2 and FIG. 5, by disposing the light guide plate 230 in the containing recess 130, not only can the light guide plate 230 be protected, but also a thin and light body of the spliced display screen can be realized. Specifically, the framework 120 is provided with a step 122, part of an edge of the light guide plate 230 abuts against the step 122. The optical film group 240 is stacked on the light guide plate 230. Therefore, a distance between the light guide plate 230 and the light sources 220 can be stably maintained, thereby preventing the light sources 220 from being crushed by the light guide board 230. In the present embodiment, part of the light sources 220 of the light guide plate 230 can be attached to the step 122 by glue, but the present disclosure is not limited thereto.

Specifically, as shown in FIG. 2 and FIG. 5, a spacer 211 is disposed on the circuit board 210. An end of the spacer 211 away from the circuit board 210 abuts against the light guide plate 230, so that the distance between the light guide plate 230 and the light sources 220 can be stably maintained.

Specifically, to increase a brightness of the backlight unit 200, the spacer 211 is made of a light-transmitting material. The light-transmitting material can be selected from one or more of polymethylmethacrylate, polyimide, epoxy resin, polyterephthalic acid. ethylene glycol, polycarbonate, polyvinyl chloride, polystyrene, and polypropylene.

Specifically, as shown in FIG. 2, FIG. 5, FIG. 6, and FIG. 7, the optical film group 240 includes a plurality of optical films 241 which are stacked. The optical films 241 at an uppermost layer are provided with a plurality of positioning parts 242. The framework 120 is provided with a plurality of matching parts 123 corresponding to the positioning parts 242. The positioning parts 242 are inserted into the matching parts 123, so that the optical films 241 are not easy to be moved and are stably attached to the framework 120.

Figure 7:
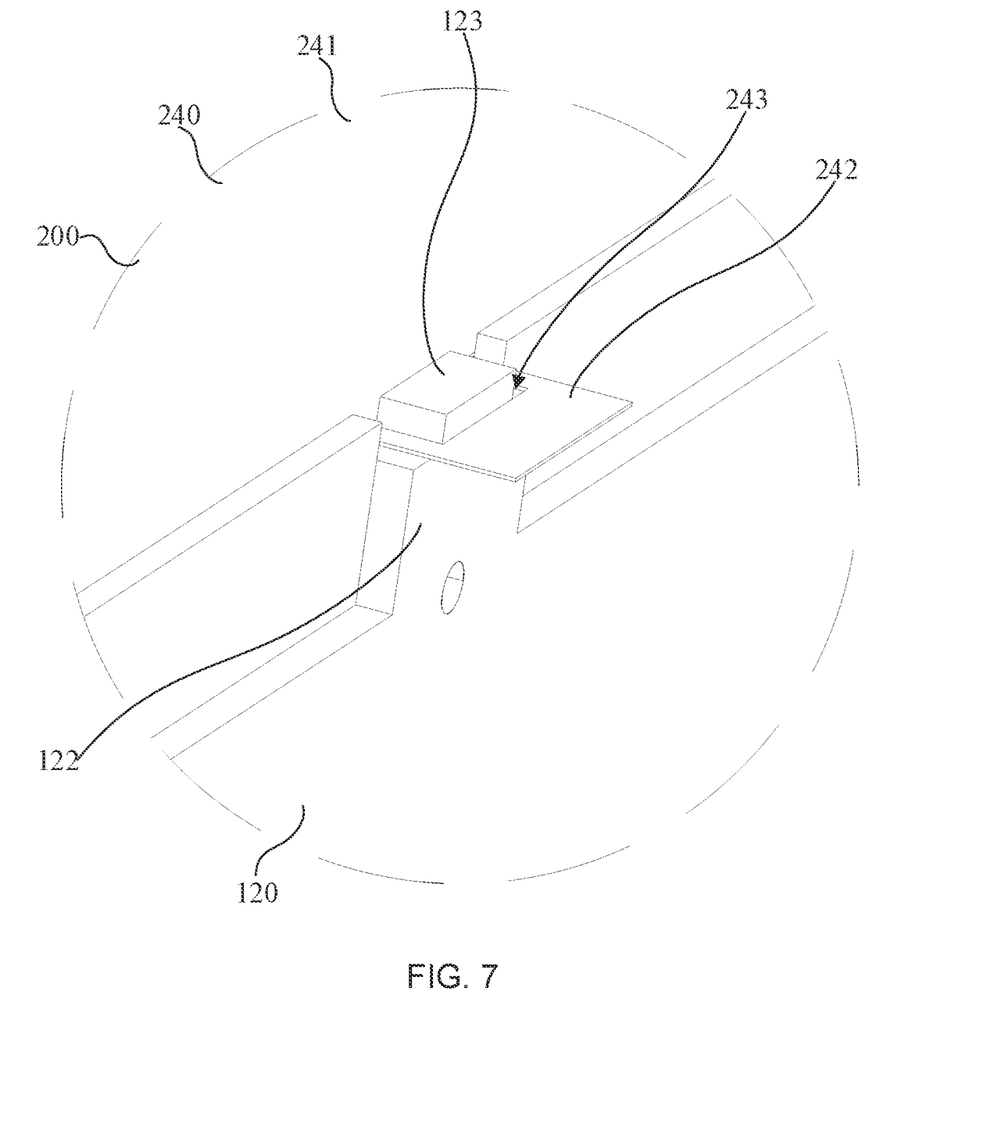
FIG. 7 is an enlarged structural schematic view showing area B of FIG. 6.

Specifically, as shown in FIG. 7, each of the positioning parts 242 is provided with a slot 243, each of the match parts 123 is provided with a connecting post 124, and the connecting post 124 is inserted into the slot 243, so that the optical films 241 are not easy to be moved and are stably attached to the framework 120. Of course, according to actual situations and specific requirements, each of the positioning parts 242 may be provided with a connecting post, each of the match portion 123 is provided with a slot, and the connecting post is inserted into the slot. This can also allow the positioning portions 242 to be inserted into the matching portions. The correspondence is not limited here.

Figure 8:
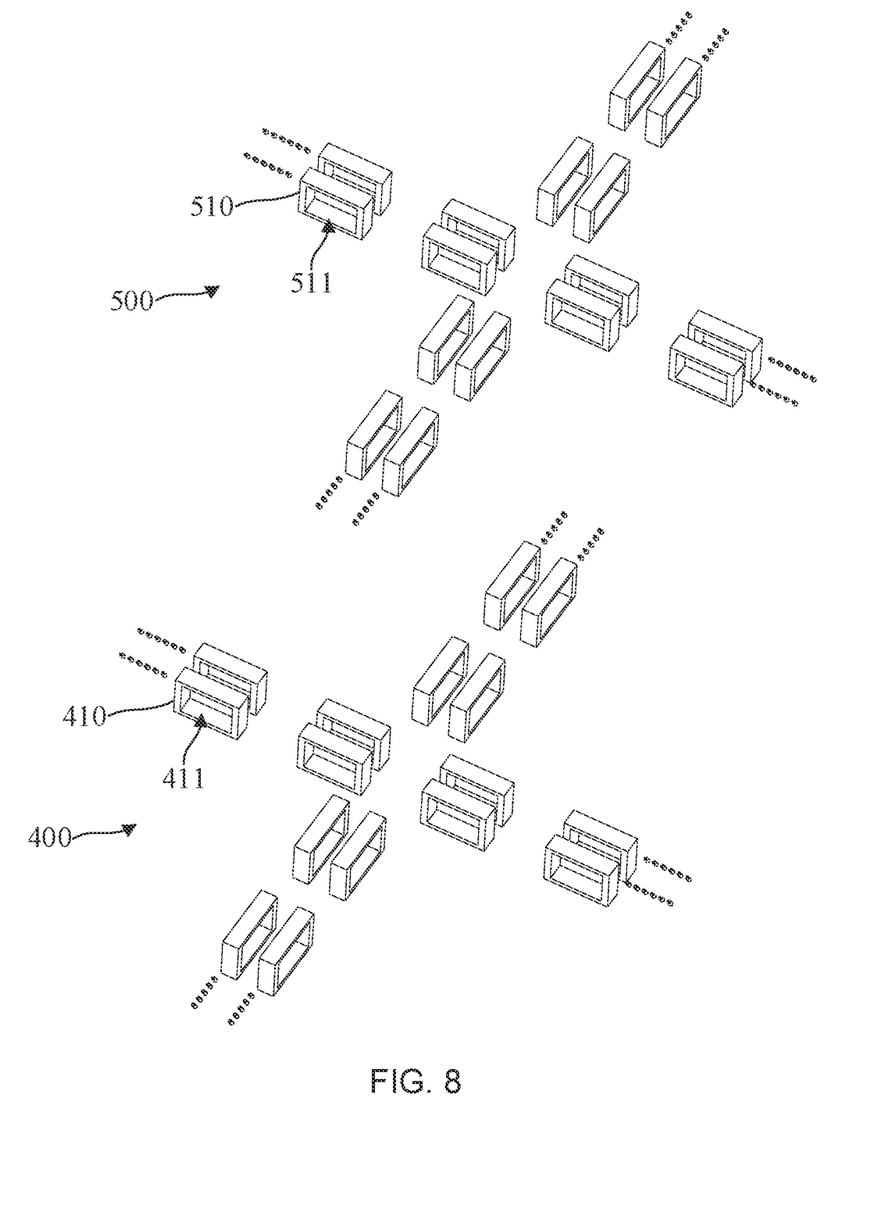
FIG. 8 are three-dimensional structural schematic views showing a first magnetic unit and a second magnetic unit.

Specifically, as shown in FIG. 3 and FIG. 8, the first magnetic unit 400 includes a plurality of first magnetic blocks 410 arranged at the splicing gap between two adjacent LCD panels 300. The second magnetic unit 500 includes a plurality of second magnetic blocks 510 arranged at the splicing gap between two adjacent liquid crystal display panels 300. Therefore, a gap between two adjacent first magnetic blocks 410 can allow light to pass through, which can improve a usage rate of light and alleviate a dark strip issue.

Specifically, the first magnetic block 410 is provided with a first hollow opening 411 for light to pass through, and the second magnetic block 510 is provided with a second hollow opening 511 for light to pass through. The first hollow opening 411 and the second hollow opening 511 can allow light to pass through, which can further improve a usage of light and alleviate a dark strip issue.

Specifically, as shown in FIG. 2 and FIG. 3, the spliced display screen also includes a first flexible connector 600 abutting against a side of the LCD panels 300 facing away from the backlight unit 200. The first flexible connector 600 corresponds to the edge frame 310 of the LCD panels 300. Two ends of the first flexible connectors 600 are attached to the case body 100. The first flexible connector 600 can prevent edges of the LCD panels corresponding to the splicing gap from outward protruding due to an overly great magnetic force between the first magnetic unit 400 and the second magnetic unit 500. Therefore, a surface of two adjacent LCD panels 300 is flat.

Specifically, a material of the first flexible connector 600 is a light-transmitting material. Since the first flexible connector 600 is made of the light-transmitting material, light can pass through the first flexible connector 600, thereby preventing light emitted from the LCD panels from be blocked by the first flexible connector 600.

Specifically, the first flexible connector 600 is straight line-shaped, membrane-shaped, or mesh-shaped. By setting the first flexible connector 600 to be straight-shaped, light emitted from the LCD panels 300 can be prevented from being blocked by the first flexible connector 600. By setting the first flexible connector 600 to be membrane-shaped or mesh-shaped, strength and support performance of the first flexible connector 600 can be enhanced. The shape of the first flexible connector 600 is not limited here.

Specifically, two ends of the first flexible connector 600 can be attached to the case body 100 (framework 120) in a binding manner. Of course, according to actual situations and specific requirements, two ends the first connector can also be attached to the case body 100 (framework 120) by glue, a hook, or other methods. An attachment method for the first flexible connector 600 is not limited here.

Specifically, as shown in FIG. 2, the spliced display screen further includes a second flexible connector 700. An end of the second flexible connector 700 is connected to the first magnetic unit 400 (the first magnetic block 410), and another end of the second flexible connector 700 is connected to the second magnetic unit 500 (the second magnetic block 510). The second flexible connector 700 can fix the LCD panels 300, thereby preventing edges of the LCD panels corresponding to the splicing gap from outward protruding due to an overly great magnetic force between the first magnetic unit 400 and the second magnetic unit 500. Therefore, a surface of two adjacent LCD panels 300 is flat.

Specifically, a material of the second flexible connector 700 is a light-transmitting material. Since the second flexible connector 700 is made of the light-transmitting material, light can pass through the second flexible connector 700, thereby preventing light emitted from the LCD panels from be blocked by the second flexible connector 700.

Specifically, the second flexible connector 700 is straight line-shaped, membrane-shaped, or mesh-shaped. By setting the second flexible connector 700 to be straight-shaped, light emitted from the LCD panels 300 can be prevented from being blocked by the second flexible connector 700. By setting the second flexible connector 700 to be membrane-shaped or mesh-shaped, strength and support performance of the second flexible connector 700 can be enhanced. The shape of the second flexible connector 700 is not limited here.

Specifically, two ends of the second flexible connector 700 can be attached to the first magnetic unit 400 (first magnetic block 410) and the second magnetic unit 500 (second magnetic block 510) in a binding manner. Of course, according to actual situations and specific requirements, two ends of the second flexible connector 700 can also be attached to the first magnetic unit 400 (first magnetic block 410) and the second magnetic unit 500 (second magnetic block 510) by glue, a hook, or other methods. An attachment method for the second flexible connector 700 is not limited here.

A spliced display screen has been described in detail by the above embodiments, which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A spliced display screen, comprising: a case body; a backlight unit disposed on a side of the case body; at least two liquid crystal display (LCD) panels spliced to each other, wherein the at least two LCD panels are attached to the case body and are disposed on a light-emitting side of the backlight unit, and each of the at least two LCD panels comprises an edge frame; a first magnetic unit disposed on a side of the at least two LCD panels close to the case body, wherein the first magnetic unit corresponds to the edge frame at a splicing junction between two adjacent LCD panels; and a second magnetic unit disposed on a side of the at least two LCD panels close to the backlight unit, the second magnetic unit corresponds to the first magnetic unit and is spaced apart from the first magnetic unit, a polarity of the first magnetic unit and a polarity of the second magnetic unit are the same, and a width of the edge frame is greater than or equal to a width of the second magnetic unit.

2. The spliced display screen of claim 1, wherein a distance between the first magnetic unit and the second magnetic unit corresponding to the first magnetic unit ranges from 1 mm to 5 mm.

3. The spliced display screen of claim 1, wherein the second magnetic unit is attached to the at least two LCD panels with glue.

4. The spliced display screen of claim 1, wherein a material of the first magnetic unit and a material of the second magnetic unit are selected from one or more of Fe, Ni, Co, Nd, Al, Cu, Ti, Mo, Ce, Pr, and La.

5. The spliced display screen of claim 1, wherein the first magnetic unit comprises a plurality of first magnetic blocks spacedly arranged along a splicing gap between the at least two LCD panels, and the second magnetic unit comprises a plurality of second magnetic blocks spacedly arranged along the splicing gap between the at least two LCD panels.

6. The spliced display screen of claim 5, wherein each of the first magnetic blocks is provided with a first hollow opening configured to allow light to pass through, and each of the second magnetic blocks is provided with a second hollow opening configured to allow light to pass through.

7. The spliced display screen of claim 1, wherein the backlight unit comprises a circuit board, a plurality of light sources disposed on the circuit board, a light guide board disposed on a light-emitting side of the light sources, and an optical film group disposed on a light-emitting side of the light guide board.

8. The spliced display screen of claim 7, wherein a spacer is disposed on the circuit board, and an end of the spacer away from the circuit board abuts against the light guide board.

9. The spliced display screen of claim 1, wherein the spliced display screen comprises a first flexible connector abutting against a side of the at least two LCD panels away from the backlight unit, the first flexible connector corresponds to the edge frame of the at least two LCD panels, and two ends of the first flexible connector are attached to the case body.

10. The spliced display screen of claim 9, wherein a material of the first flexible connector is a light-transmitting material.

11. The spliced display screen of claim 9, wherein the first flexible connector is straight line-shaped, membrane-shaped, or mesh-shaped.

12. The spliced display screen of claim 1, wherein the spliced display screen comprises a second flexible connector, an end of the second flexible connector is connected to the first magnetic unit, and another end of the second flexible connector is connected to the second magnetic unit.

13. The spliced display screen of claim 12, wherein a material of the second flexible connector is a light-transmitting material.

14. The spliced display screen of claim 12, wherein the second flexible connector is straight line-shaped, membrane-shaped, or mesh-shaped.

15. The spliced display screen of claim 1, wherein the case body comprises a backplate and a framework connected to a periphery of the backplate, the backplate and the framework define a containing recess, at least part of the backlight unit is disposed in the containing recess, the first magnetic unit is attached to the backplate, and the at least two LCD panels are attached to the framework.

16. The spliced display screen of claim 15, wherein the framework is provided with a guide recess corresponding to the first magnetic unit, and an end of the first magnetic unit is disposed in the corresponding guide recess.

17. The spliced display screen of claim 15, wherein the backplate is provided with a fixing strip corresponding to the first magnetic unit, and the first magnetic unit is disposed on the fixing strip.

18. The spliced display screen of claim 17, wherein the fixing strip is provided with a recess corresponding to the first magnetic unit, and the first magnetic unit is clamped in the recess.

19. The spliced display screen of claim 17, wherein the first magnetic unit is attached to the fixing strip with glue.

20. The spliced display screen of claim 17, wherein a material of the fixing strip is a light-transmitting material.

\* \* \* \* \*